Sept. 22, 1959   J. G. INGRES   2,905,151
MOTOR MECHANISM
Filed Sept. 13, 1954   3 Sheets-Sheet 1
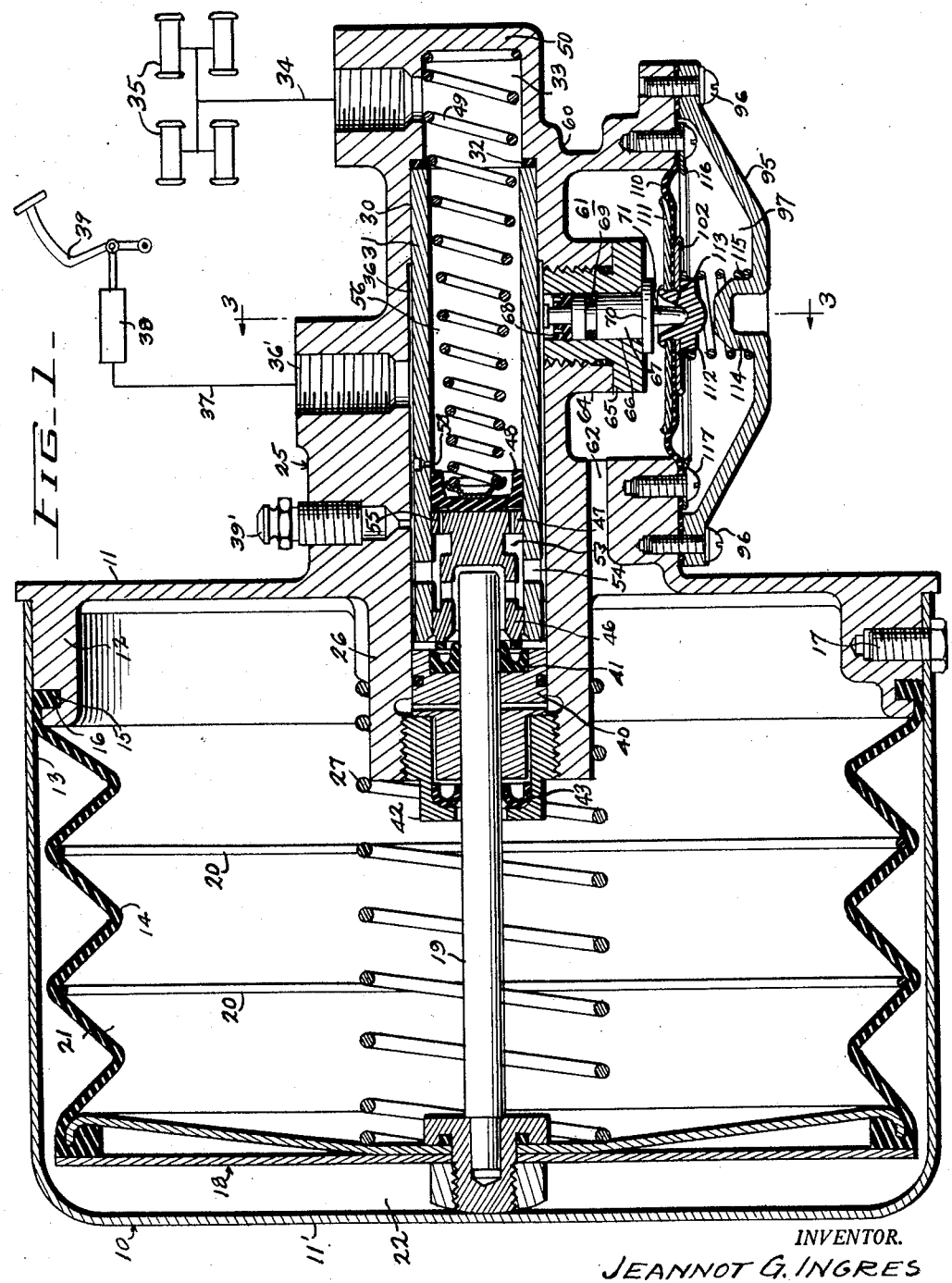
INVENTOR.
JEANNOT G. INGRES
BY
John F. Phillips
ATTORNEY Sept. 22, 1959 J. G. INGRES 2,905,151
MOTOR MECHANISM
Filed Sept. 13, 1954 3 Sheets-Sheet 2
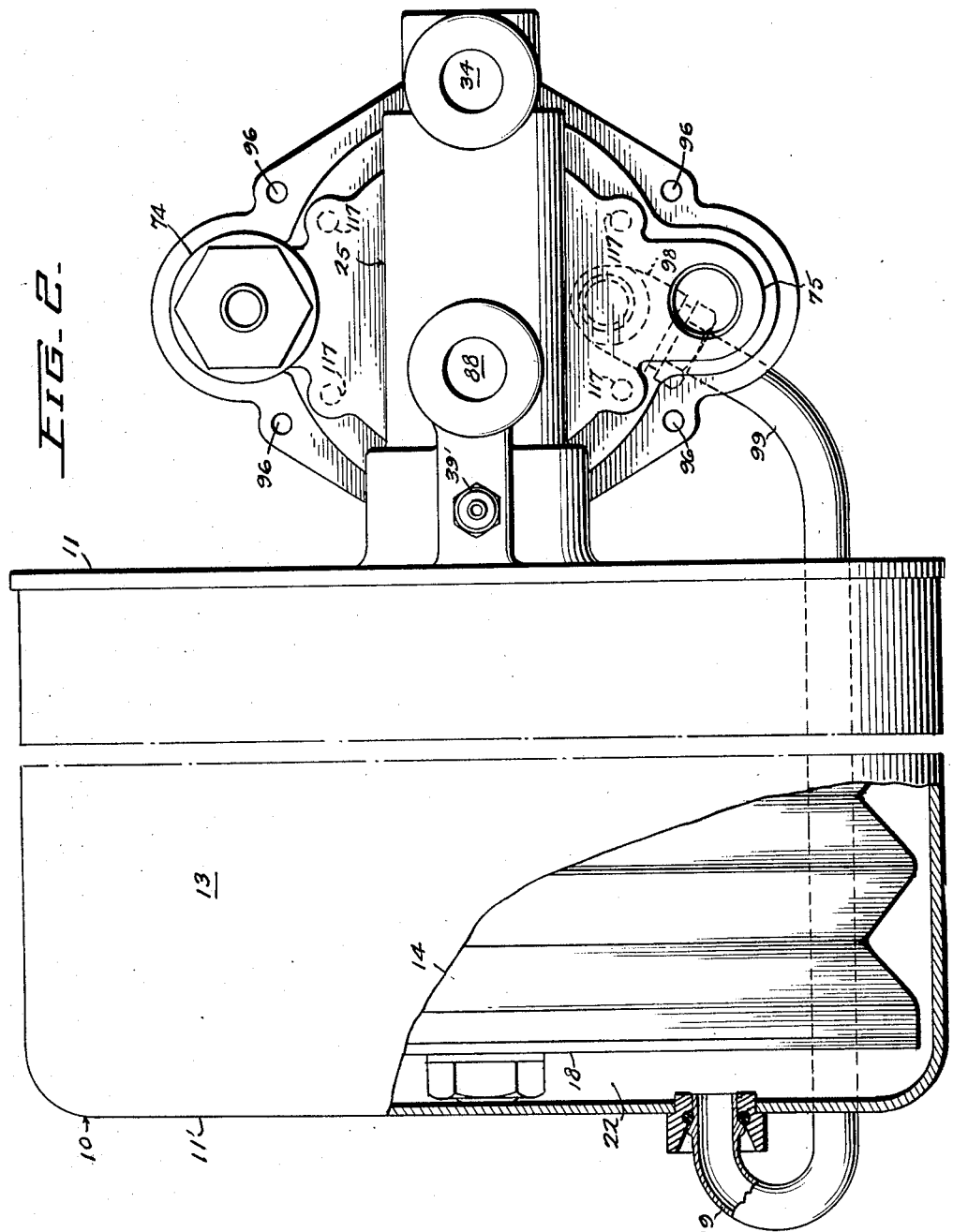
INVENTOR.
JEANNOT G. INGRES
BY
John F. Phillips
ATTORNEY

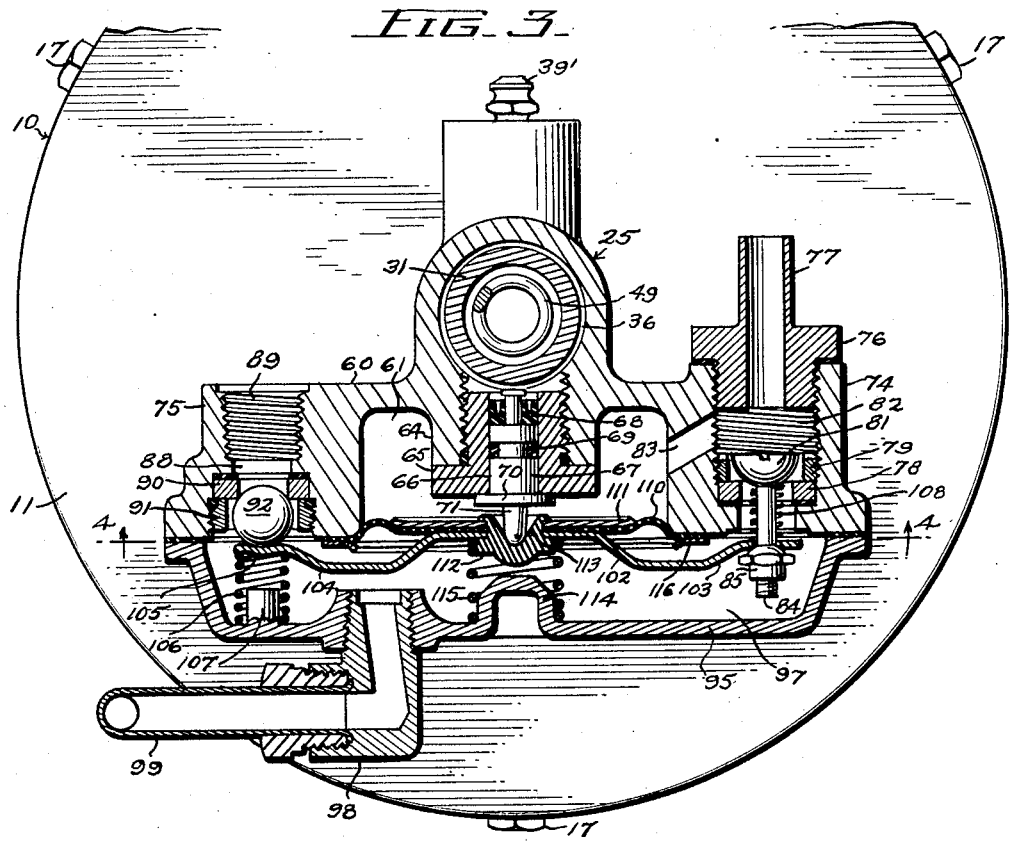
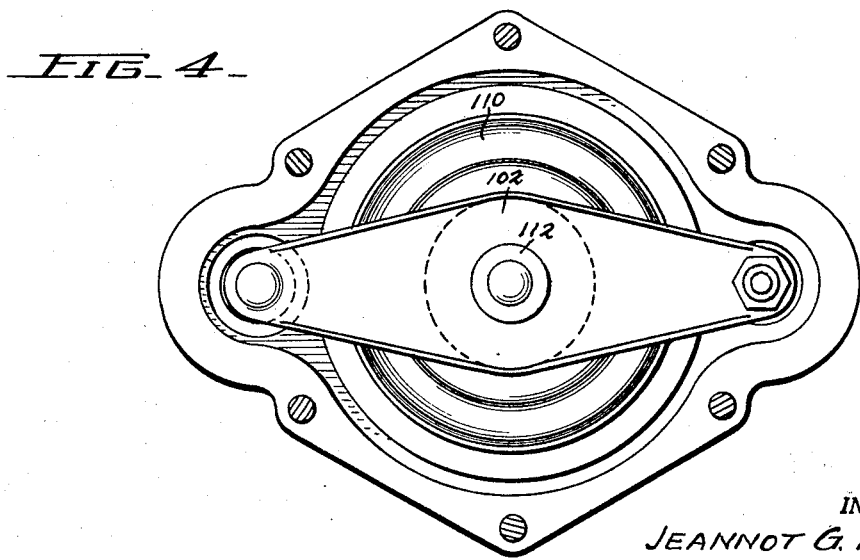

United States Patent Office 2,905,151
Patented Sept. 22, 1959

2,905,151

MOTOR MECHANISM

Jeannot G. Ingres, Dearborn, Mich., assignor to Kelsey-Hayes Company, a corporation of Delaware Application September 13, 1954, Serial No. 455,647

8 Claims. (Cl. 121—38)

This invention relates to a motor mechanism especially for use in a booster brake mechanism and more particularly to such a mechanism of the type wherein a conventional master cylinder, operable by a brake pedal, is adapted to displace fluid to energize a booster brake motor and to assist such motor in applying the brakes.

A number of booster brake mechanisms of the type referred to have been developed. They employ a booster motor having a follow-up valve mechanism which operates to energize the booster motor, and the valve mechanism is operable by fluid displaced from a conventional master cylinder to maintain the motor energized so long as the brake pedal is being depressed. Upon the arresting of movement of the brake pedal, no further fluid is displaced from the conventional master cylinder, and an extremely slight additional movement of the fluid displacing unit of the booster mechanism will drop the pressure affecting the valve mechanism. The valve mechanism thereupon returns to lap position or to normal off position to de-energize or reduce the energization of the motor, according to operation of the brake pedal.

In the co-pending application of David T. Ayers, Jr., Serial No. 455,509, filed September 13, 1954, now Patent No. 2,852,921, there is described and claimed a booster mechanism which is also disclosed but not claimed in the present application. In the co-pending application referred to, fluid is displaced from the conventional master cylinder behind the power-operated plunger of the booster mechanism to assist such plunger in displacing fluid. Fluid behind the plunger is adapted to flow in one direction past the plunger to the high-pressure chamber of the booster mechanism, thus displacing fluid into the brake lines prior to motor energization. This is accomplished without the use of conventional spring-pressed check valves and means for maintaining such valves open when the parts are in normal off positions. The provision of such means affords communication between the conventional master cylinder and the brake lines to maintain residual pressure in the system and to provide for expansion and contraction of the fluid throughout the system. The latter function is accomplished in the co-pending application referred to by a provision of a restricted orifice for supplying fluid from the conventional master cylinder to the booster mechanism just in advance of the fluid displacing piston, such orifice being closed immediately upon the power operation of the plunger.

The valve mechanism disclosed in the co-pending application referred to forms no part per se of such application, but forms the subject matter of the present application, and the principal object of the present invention is to provide a novel highly simplified and efficient type of valve mechanism for controlling the energization of the motor of a booster brake mechanism of the type referred to.

A further object is to provide such an apparatus wherein a rocking lever is normally biased to a position de-energizing the booster motor and is operable by fluid displaced from the master cylinder to energize the motor, and to provide novel means responsive to differential pressures in the motor for opposing operation of the valve mechanism in proportion to the degree of energization of the motor.

A further object is to provide such apparatus wherein the opposing of motor energizing movements of the valve operating lever is accomplished by a novel highly flexible diaphragm having opposite sides thereof subject to pressures in the chambers of the differential pressure operated booster motor.

A further object is to provide an apparatus of the character referred to wherein the diaphragm is relatively large and highly flexible and is secured centrally thereof to the valve operating lever to form therewith a motor control unit, the high degree of flexibility of the diaphragm permitting completely free movement of the valve-controlling lever except for the means associated therewith for biasing the valves to normal off positions.

Other objects and advantages of the invention will become apparent during the course of the following description.

In the drawings I have shown one embodiment of the invention. In this showing:

Figure 1 is an axial sectional view through the booster mechanism taken transversely of the valve operating lever, the brake cylinders and conventional master cylinder and the lines connected thereto being diagrammatically represented, Figure 2 is a plan view of the apparatus, parts being shown in section, Figure 3 is a section taken substantially on line 3—3 of Figure 1 showing the full length of the valve operating lever and the elements associated therewith, and Figure 4 is a section taken substantially on line 4—4 of Figure 3, parts being shown in elevation.

Referring to Figure 1, the numeral 10 designates a fluid pressure motor comprising a cast head 11 having a flange 12 over which is slipped the open end of a cylinder 13 having a closed end 11' forming the second head of the motor. The fluid pressure responsive unit of the motor comprises a bellows 14 having a bead 15 arranged in a groove 16 in the flange 12 and maintained in position merely by slipping the cylinder 13 in the position shown. This cylinder is fixed to the head 11 by suitable screws 17. The opposite end of the bellows 14 is fixed to a plate structure 18 to which is connected a power transmitting rod 19 further described below. The folds of the bellows 14 are maintained properly distended by suitable rings 20. The space 21 within the bellows forms a constant pressure chamber of the motor, while the space 22, external of the bellows and back to the plate structure 18, constitutes the variable pressure motor chamber as further described below.

Preferably cast integral with the head 11 is a master cylinder body 25 one end 26 of which projects into the motor chamber 21 and is received within one end of a return spring 27, the other end of this spring engaging the plate structure 18 to bias the latter to the off position shown in Figure 1.

The body 25 is provided with a bore 30 in which is arranged a sleeve 31 engaging at one end against a seal 32 beyond which is a chamber 33 communicating through suitable lines 34 with the vehicle wheel cylinders 35.

To the left of a point spaced from its right-hand end (Figure 1) the bore 30 is enlarged to form an annular chamber 36. This chamber communicates through a port 36' with a line 37 leading to a conventional master cylinder 38 having therein the usual piston (not shown) operable by a brake pedal 39. Communicating with the chamber 36 is a conventional air bleeder 39'.

Within the left-hand end of the enlarged bore is arranged a bearing 40 in which the rod 19 is slidable, this bearing being provided with a seal 41. The bearing 40 fits snugly within the adjacent end of the enlarged bore and is maintained in position by a nut 42 having a seal 43 surrounding the rod 19.

A fluid displacing plunger 46 is arranged in the sleeve 31 and is provided with a head 47 against which is arranged a flexible lipped cup 48 biased to off position by a spring 49, the end of which remote from the plunger 46 engages against an end wall 50 of the body 25.

The plunger 46 is reduced intermediate its ends to form a chamber 53 communicating with the annular chamber 36 through ports 54 in the sleeve 31. The head 47 is provided therethrough with passages 55 for the flow of fluid from the chamber 53 into the high-pressure chamber 56 into which the plunger is operable to displace fluid into the wheel cylinders. Fluid is free to flow through passages 55 and around the lip of the cup 48 when the brake pedal 39 is initially depressed and pressure in the chamber 53 is higher than pressure in the chamber 56. Reverse flow of such fluid obviously cannot take place. For the purpose of balancing pressures in the system when the parts are in the off positions shown in Figure 1, the sleeve 31 is provided with a small orifice 58 communicating between the chamber 36 and the chamber 56, the orifice 58 being arranged in close proximity to the lip of the cup 48 to be closed immediately upon actuation of the plunger 46. The parts just referred to form no part per se of the present invention but are disclosed and claimed in the co-pending application identified above.

A novel type of control valve mechanism is provided for the motor 10. Referring to Figures 1 and 3, the numeral 60 designates a preferably integral enlargement carried by the body 25 and providing therewith an annular chamber 61. This chamber (Figure 1) is in constant communication with the motor chamber 21 through a passage 62. Axially of the chamber 61, the body 25 is provided with a depending annular boss 64 in which is threaded a nut 65 formed with a cylindrical opening 66 entirely therethrough. This opening receives a plunger 67 adequately leakage-sealed as at 68 and 69. Below the nut 65, the plunger 67 is provided with an annular flange 70, seating against the bottom of the nut 65 when the parts are in the off positions shown in Figure 3. Beneath the flange 70, the plunger 67 is provided with a depending stem 71, preferably tapering to decrease in thickness downwardly and provided with a rounded lower end.

The enlarged body portion 60 is provided at opposite sides thereof with cylindrical bosses 74 and 75 having vertical parallel axes. In the upper end of the boss 74 is threaded a connecting member 76 having an upstanding nipple 77 for connection with a vacuum line (not shown) leading to any suitable source of vacuum such as the intake manifold of the motor vehicle engine. In the lower portion of the boss 74 is arranged a valve seat 78 retained in position by a nut 79 and engageable by a normally open hemispherical valve 81. The space between the valve 81 and fitting 76 forms a vacuum chamber 82 in fixed communication with the chamber 61 through a port 83. The valve 81 carries a depending stem 84 provided at its lower end with a nut 85 for a purpose to be described.

The boss 75 is provided with a port 88, the upper end of which is threaded as at 89 to receive a fitting for supporting thereabove a suitable air cleaner (not shown). Below the port 88 is arranged a valve seat 90 retained in position by a nut 91 and engageable by a ball valve 92 arranged therebeneath. The ball valve 92 is normally closed, as further described below.

The bottom of the body portion 60 is provided with a flanged cover 95 secured in position by screws 96. The cover 95 forms therewithin a control chamber 97. Into the cover 95 is tapped an elbow fitting 98 to which is connected one end of a pipe 99 and the other end of this pipe communicates with the variable pressure chamber 22 of the motor through the head 11' (Figure 2).

The valves 81 and 92 are controlled by a lever 102. One end 103 of this lever is apertured for the projection therethrough of the valve stem 84, and the nut 85 preferably has its upper face forming a section of a sphere, as shown in Figure 3, and engaging the lever end 103. The other end 104 of the lever is provided with a depression 105 supporting the ball 92. Such end of the lever 102 is biased upwardly by a spring 106 the lower end of which surrounds a boss 107 preferably cast integral with the cover 95. A light spring 108 surrounds the stem 84. This spring engages at its lower end with the lever end 103 and at its upper end with the valve 81 to urge the latter upwardly and maintain the nut 85 against the bottom of lever end 103.

A diaphragm 110 is arranged against the top face of the lever 102 and a clamping plate 111 is arranged above the diaphragm. The lever 102, diaphragm 110 and plate 111 are fixed to each other by a thimble 112 having a recess 113 in the upper face thereof receiving the bottom of the pin 71.

The lower hemispherical face of the thimble 112 is engageable with the top of a boss 114 preferably formed integral with the cover 95 to positively limit downward movement of the thimble 112. The boss 114 centers the lower end of a spring 115 which seats against the cover 95. The upper end of the spring 115 surrounds the thimble 112 and engages the bottom face of the lever 102. The diaphragm is secured in position by a ring 116 fixed to the bottom of the housing portion 60 by screws 117 (Figure 1).

*Operation*

The parts normally occupy the positions shown in Figures 1 and 3. The motor chamber 21 communicates through passage 62 with the chamber 61, and this chamber is in fixed communication with the vacuum chamber 82 through the port 83. Therefore, vacuum is always present in the chamber 21. The variable pressure motor chamber 22 is in fixed communication through pipe 99 with the chamber 97, and atmospheric pressure or vacuum will be present in this chamber in accordance with the operation of the valve mechanism. As shown, the valve 92 is normally closed and the valve 81 is normally open, in which case, vacuum will be present in the chamber 97 and in the motor chamber 22. Thus the motor is vacuum-suspended.

When the brake is to be operated, the pedal 39 will be depressed to displace fluid from the master cylinder 38 through the line 37 into chamber 36. A very slow flow of such fluid initially takes place through the port 58 into the chamber 56. More of the fluid will flow through ports 54 into the space 53 surrounding the plunger 47, and such fluid will flow through ports 55 around the lip of the cup 48 into the chamber 56. This operation takes place in accordance with the invention disclosed in the co-pending application identified above.

Fluid flowing into the chamber 56 will continue through lines 34 into the brake cylinders 35 to take up play between the brake shoes and drums. Fluid will continue to flow around the lip of the cup 48 as long as pressure in the space 53 exceeds pressure in the space 56. During such flow of fluid, pressure naturally will increase to some extent in the chamber 36, but this pressure will not be sufficient to move the plunger 67 downwardly against the tension of the spring 115.

As soon as the brake shoes engage the drums, there will be a sudden increase in pressure in the chamber 36. The sudden increase in pressure in the chamber 56 will stop the flow of fluid from the space 53 around the lip of the cup 48, thus causing an increase in pressure in the space 53 due to displacement of fluid from the master cylinder 38. This pressure, duplicated in chamber 36, moves the plunger 67 downwardly, thus depressing the thimble 112 (Figure 3). At this time, the spring 106 will hold the ball valve 92 closed and downward movement of the plunger 67 will cause the lever 102 to fulcrum at its point of engagement with the ball 92. The lever end 103 accordingly moves downwardly and almost instantly closes the valve 81 to disconnect chamber 97 from chamber 82. Engagement of the valve 81 with its seat 78 prevents further downward movement of the valve 81. As the thimble 112 continues to move downwardly, therefore, the lever 102 will fulcrum at its point of engagement with the nut 85, whereupon the lever end 104 will be moved downwardly to release the ball 92. Since vacuum will have been present in the chamber 97 when the apparatus was inoperative and atmospheric pressure is present above the valve 92, the releasing of pressure against the bottom of the valve 92 will cause air pressure above the valve to immediately unseat it. Air accordingly flows into the chamber 97, thence through pipe 99 into the motor chamber 22. Thus the motor will be energized and the plate structure 18 will move toward the right, carrying with it the rod 19. This rod engages the plunger 46 to move it to the right as viewed in Figure 1, immediately closing the port 58 and building up pressure in the chamber 56. Thus the foot-generated pressure and the force of the motor will be added together to move the plunger 46 to the right to apply the brakes.

With the parts in the normal off positions, vacuum will be present in both of the chambers 61 and 97, above and below the diaphragm 110. This diaphragm at such time, therefore, will be wholly without function. However, immediately upon the opening of the valve 92, differential pressures will be established on opposite sides of the diaphragm 110 and the higher pressure in the chamber 97 will tend to oppose movement of the diaphragm 110 downwardly. This opposition will be in proportion to the degree of energization of the motor, pressures in the chambers 61 and 97 respectively equaling pressures in the motor chambers 21 and 22.

In order for the plunger 67 to maintain the air valve 92 open, therefore, the pressure generated by the master cylinder 38 and communicated to the annular chamber 36 must exceed differential pressures affecting the diaphragm 110. If movement of the brake pedal is retarded, motor force applied to the plunger 46 to move it to the right will result in an immediate drop in pressure in the space 53 and in the chamber 36, whereupon pressure beneath the diaphragm 110 will react upwardly on the plunger 67, permitting the spring 106 to force the valve 92 toward its seat. If movement of the brake pedal is arrested, the ball 92 will solidly engage its seat 90 and the spring 115 will move the lever end 103 upwardly sufficiently to crack the valve 81 to exhaust air from the chamber 97. Accordingly, it will be apparent that the valve action takes place instantly in response to operations of the brake pedal and a perfect follow-up action of the rod 19 relative to the brake pedal 39 will take place.

When the brake pedal is released, there will be an immediate drop in pressure in the annular chamber 36, thus relieving pressure acting on the upper end of the plunger 67. The ball 92 will be seated by its spring 106 and the spring 115 will swing the lever end 103 upwardly to relieve the valve 81 for movement to its maximum open position to again vacuum suspend the motor. The degree of maximum opening movement of the valve 81 may be adjusted by turning the nut 85. When the brake pedal is released, air pressure acting on the bottom of the valve 81 instantly opens such valve and the light spring 108 supports the valve 81 in open position.

In prior constructions of this general type, it has been common practice to use a valve operating plunger subject to primary pressures in the master cylinder to actuate the motor upon depression of the brake pedal, and to use an opposing plunger subject to secondary pressures in the high-pressure master cylinder to provide the follow-up action and return the valve mechanism to off position when the brake pedal is released. Such constructions are relatively expensive and fail to provide a "soft" pedal, that is, a pedal having a low cut-in pressure. With the present device, a single valve operating plunger 67 is employed and this plunger is operable in a simple bored nut 65 to be responsibe to pressures generated in the master cylinder 38. Pressures opposing motor energizing movements of the valve mechanism in the present case are not hydraulic pressures, but are pressures present in the motor, thus providing greater elasticity in operation.

It further will be noted that the present construction further makes for simplification and economy in manufacture by permitting assembly as a unit of the valve operating lever 102 and diaphragm 110. These elements are fixed together solely by the single thimble 112. The latter element acts not only as a securing means for the purpose stated, but provides several other functions permitting maximum simplification. The thimble constitutes the element engageable by the plunger stem 71 for controlling the valve, and the thimble engages the boss 114 to limit downward movement of the center of the lever 102. The thimble 112 also acts as a centering means for the upper end of the spring 115.

Because of its size and high degree of flexibility, the diaphragm 110 may be fixed to the lever 102. This lever not only moves bodily upwardly and downwardly but pivots at different times on its respective ends. Thus the lever assumes different positions vertically of the plunger 67 and different angular positions. This is permitted by virtue of the size and high degree of flexibility of the diaphragm 110. This diaphragm is perfectly free to move vertically at its central portion with the thimble 112, and the diaphragm permits the plate 111 to assume different angles in accordance with movements of the lever 102. The diaphragm also serves as means for sealing the chambers 61 and 97, the pressures in which control the functioning of the diaphragm as means for opposing downward movement of the plunger 67.

Accordingly, it will be apparent that the present device is highly advantageous from the standpoint of simplicity and economy in construction and assembly. The diaphragm itself, in the absence of opposing pressures acting thereon, permits perfectly free movement of the lever 102. The cut-in pressure for the motor thus becomes wholly dependent upon the two springs 106 and 115 and these springs may be tensioned as desired.

It is to be understood that the form of the invention shown is to be taken as a preferred example of the same and that various changes may be made in the construction as do not depart from the scope of the appended claims.

I claim:

1. A motor mechanism comprising a manually operable fluid displacing device, a member to be operated, a fluid pressure motor connected to operate said member and having a pair of chambers, a valve mechanism comprising a body having a pair of control chambers communicating respectively with the chambers of said motor, an imperforate flexible diaphragm sealing said control chambers from each other, one of said control chambers being in fixed communication with a source of relatively low pressure, a normally open first valve connecting the other control chamber to said source, a normally closed second valve controlling communication between a source of higher pressure and said other control chamber, lever means connected between said valves parallel to said diaphragm, and means connected to be responsive to pressures in said manually operable fluid displacing device for moving said lever to close said first valve and open said second valve, said lever being fixed intermediate its ends to said diaphragm, and said last-named means having rocking engagement with said lever, whereby said diaphragm flexes in accordance with rocking movement of said lever.

2. A motor mechanism comprising a manually operable fluid displacing device, a member to be operated, a fluid pressure motor connected to operate said member and having a pair of chambers, a valve mechanism for controlling pressures in said motor chambers, said valve mechanism comprising a body having a pair of control chambers communicating respectively with the chambers of said motor, an imperforate flexible diaphragm sealing said control chambers from each other, one of said control chambers being in fixed communication with a source of relatively low pressure, a normally open first valve connecting the other control chamber to said source, a normally closed second valve controlling communication between a source of higher pressure and said other control chamber, lever means connected between said valves parallel to said diaphragm centrally thereof, means connected to be responsive to pressures in said manually operable fluid displacing device for moving said lever to close said first valve and open said second valve, and resilient means connected to oppose such movement of said lever, said lever being fixed intermediate its ends to said diaphragm, and said last-named means having rocking engagement with said lever, whereby said diaphragm flexes in accordance with rocking movement of said lever.

3. A motor mechanism comprising a manually operable fluid displacing device, a member to be operated, a differential fluid pressure operated motor having a pressure responsive unit connected to operate said member and having a pair of chambers, a valve mechanism comprising a housing provided therein with a first chamber communicating with one of said motor chambers, said housing having a vacuum chamber in fixed communication with said first chamber, a diaphragm secured to said housing and forming one wall of said first chamber, a cover secured to said housing and forming with said diaphragm a second chamber communicating with the other motor chamber, a vacuum valve seat carried by said housing between said vacuum chamber and said second chamber, an air valve seat in said housing between said second chamber and the atmosphere, a vacuum valve engageable with said vacuum valve seat, an air valve engageable with said air valve seat, a lever projecting between said valves, said vacuum valve having a stem engaging one end of said lever, the other end of said lever engaging said air valve, a spring engaging said other end of said lever to normally bias said air valve to closed position, a spring engaging said lever intermediate its ends to bias it toward said diaphragm, said lever and said diaphragm being fixed to each other at a point intermediate their ends, means connected to be responsive to pressure in said manually operable fluid displacing device for applying force to said lever intermediate its ends to move it against the tension of the second-named spring, and a thimble securing said diaphragm and said lever together at said intermediate point, said means for applying a force to said lever engaging said thimble.

4. A motor mechanism comprising a manually operable fluid displacing device, a member to be operated, a differential fluid pressure operated motor having a pressure responsive unit connected to operate said member and having a pair of chambers, a valve mechanism comprising a housing provided therein with a first chamber communicating with one of said motor chambers, said housing having a vacuum chamber in fixed communication with said first chamber, a diaphragm secured to said housing and forming one wall of said first chamber, a cover secured to said housing and forming with said diaphragm a second chamber communicating with the other motor chamber, a vacuum valve seat carried by said housing between said vacuum chamber and said second chamber, an air valve seat in said housing between said second chamber and the atmosphere, a vacuum valve engageable with said vacuum valve seat, an air valve engageable with said air valve seat, a lever projecting between said valves, said vacuum valve having a stem engaging one end of said lever, the other end of said lever engaging said air valve, a spring engaging said other end of said lever to normally bias said air valve to closed position, a spring engaging said lever intermediate its ends to bias it toward said diaphragm, said lever and said diaphragm being fixed to each other at a point intermediate their ends, means connected to be responsive to pressure in said manually operable fluid displacing device for applying force to said lever intermediate its ends to move it against the tension of the second-named spring, and a thimble securing said diaphragm and said lever together at said intermediate point, said means for applying a force to said lever comprising a cylinder communicating with said pedal operable fluid displacing device and having a plunger therein engageable with said thimble.

5. A motor mechanism comprising a manually operable fluid displacing device, a member to be operated, a differential fluid pressure operated motor having a pressure responsive unit connected to operate said member and having a pair of chambers, a valve mechanism comprising a housing provided therein with a first chamber communicating with one of said motor chambers, said housing having a vacuum chamber in fixed communication with said first chamber, a diaphragm secured to said housing and forming one wall of said first chamber, a cover secured to said housing and forming with said diaphragm a second chamber communicating with the other motor chamber, a vacuum valve seat carried by said housing between said vacuum chamber and said second chamber, an air valve seat in said housing between said second chamber and the atmosphere, a vacuum valve engageable with said vacuum valve seat, an air valve engageable with said air valve seat, a lever projecting between said valves, said vacuum valve having a stem engaging one end of said lever, the other end of said lever engaging said air valve, a spring engaging said other end of said lever to normally bias said air valve to closed position, a spring engaging said lever intermediate its ends to bias it toward said diaphragm, said lever and said diaphragm being fixed to each other at a point intermediate their ends, means connected to be responsive to pressure in said manually operable fluid displacing device for applying force to said lever intermediate its ends to move it against the tension of the second-named spring, and a thimble securing said diaphragm and said lever together at said intermediate point, said thimble being provided at the end opposite said second-named spring with a recess, said means for applying a force to said lever comprising a cylinder communicating with said pedal operable fluid displacing device and having a plunger therein provided at one end with a pin engaging in said recess.

6. A motor mechanism comprising a manually operable fluid displacing device, a member to be operated, a differential fluid pressure operated motor having a pressure responsive unit connected to operate said member and having a pair of chambers, a valve mechanism comprising a housing having a first chamber communicating with one of said motor chambers and with a source of vacuum, a diaphragm secured to said housing and forming one wall of said first chamber, a cover secured to said housing and forming with said diaphragm a second chamber communicating with the other motor chamber, a vacuum valve seat carried by said housing, a normally open vacuum valve engageable with said seat and controlling communication between said second chamber and said source, an air valve seat in said housing, an air valve normally engaging said seat and closing communication between said second chamber and the atmosphere, a lever having mechanical operating engagement at one end with said vacuum valve and at its other end with said air valve, a spring engaging said other end of said lever to normally bias said air valve to closed position, a thimble securing said diaphragm axially thereof to said lever at a point intermediate the ends of the latter, a spring engaging said lever intermediate its ends to bias it toward said diaphragm, a boss carried by said cover in the path of travel of said diaphragm to limit its movement against the tension of said last-named spring, and means connected to be responsive to pressure in said manually operable fluid displacing device for applying a force to said lever intermediate its ends to move it against the tension of said second-named spring.

7. Apparatus constructed in accordance with claim 6 wherein said second-named spring engages said thimble and surrounds said boss to be maintained in position thereby.

8. A motor mechanism comprising a manually operable fluid displacing device, a member to be operated, a fluid motor connected to operate said member and having a pair of chambers, a valve mechanism comprising a pair of valves normally occupying positions in which they are connected to balance pressures in said motor chambers, a lever having operative connection at its ends with the respective valves, a diaphragm having opposite sides connected to be subject to pressures in the respective motor chambers, a recessed thimble fixing said diaphragm to said lever at a point intermediate the ends thereof, and means connected to be responsive to pressure of fluid displaced from said manually operable fluid displacing device for operating said lever, said means comprising a pin engaging in the bottom of the recess in said thimble, said recess being tapered toward its open end to provide for rocking of said lever relative to said pin.

References Cited in the file of this patent

UNITED STATES PATENTS

| 2,446,884 | Price | Aug. 10, 1948 |
| 2,532,462 | Rockwell | Dec. 5, 1950 |
| 2,587,403 | Stelzer | Feb. 26, 1952 |
| 2,658,347 | Stelzer | Nov. 10, 1953 |
| 2,658,348 | Stelzer | Nov. 10, 1953 |
| 2,662,376 | Price | Dec. 15, 1953 |
| 2,667,861 | Rockwell | Feb. 2, 1954 |
| 2,670,603 | Allin et al. | Mar. 2, 1954 |